United States Patent
Duksa

(10) Patent No.: US 10,323,664 B2
(45) Date of Patent: Jun. 18, 2019

(54) ORIFICE MODULE FOR FLOW SWITCH SYSTEM

(71) Applicant: Thomas R. Duksa, Harwinton, CT (US)

(72) Inventor: Thomas R. Duksa, Harwinton, CT (US)

(*) Notice: Subject to any disclaimer, the term of this patent is extended or adjusted under 35 U.S.C. 154(b) by 175 days.

(21) Appl. No.: 15/460,644

(22) Filed: Mar. 16, 2017

(65) Prior Publication Data

US 2017/0276251 A1   Sep. 28, 2017

Related U.S. Application Data

(60) Provisional application No. 62/310,066, filed on Mar. 18, 2016.

(51) Int. Cl.
| | | |
|---|---|---|
| *F15D 1/02* | (2006.01) |
| *F16K 37/00* | (2006.01) |
| *F17D 3/01* | (2006.01) |
| *G01P 13/00* | (2006.01) |
| *G05D 7/00* | (2006.01) |
| *H01H 35/24* | (2006.01) |

(52) U.S. Cl.
CPC ............ *F15D 1/02* (2013.01); *F16K 37/0033* (2013.01); *F17D 3/01* (2013.01); *G01P 13/00* (2013.01); *G05D 7/00* (2013.01); *H01H 35/24* (2013.01)

(58) Field of Classification Search
CPC ........ H01H 35/40; H01H 35/405; H01H 1/16; H01H 29/26; H01H 35/10; H01H 35/24; H01H 35/346; H01H 36/00; H01H 3/14; H01H 3/26; H01H 7/02; H01H 85/28; F15D 1/02; F16K 37/0033; G01P 13/00; F17D 3/01; G05D 7/00
USPC ..... 200/81.4–81.6, 81.8, 81.9 R, 81.9 M, 82, 200/81 H
See application file for complete search history.

(56) References Cited

U.S. PATENT DOCUMENTS

| | | | | |
|---|---|---|---|---|
| 4,499,347 A * | 2/1985 | Richards | ................ | H01H 35/40 200/81.9 M |
| 5,602,372 A * | 2/1997 | Strelow | .................. | H01H 35/40 200/81.9 R |
| 5,661,277 A * | 8/1997 | Graham, II | ............ | H01H 35/40 137/557 |
| 5,925,825 A * | 7/1999 | Cochimin | ............... | F04B 47/06 73/723 |
| 6,472,624 B1* | 10/2002 | Harris | .................. | H01H 35/405 200/81.9 M |
| 7,028,561 B2* | 4/2006 | Robertson | .............. | B67D 7/085 222/52 |

* cited by examiner

*Primary Examiner* — Ahmed M Saeed
(74) *Attorney, Agent, or Firm* — Alix, Yale & Ristas, LLP

(57) ABSTRACT

An orifice module for a flow switch system has a cylindrical body which is symmetric about a central axis which defines a metering orifice. An axial central hub holds the stem. The hub connects to the cylindrical body by at least three support spokes which forms a plurality of flow channels angularly disposed about the central axis. The module interacts with the flow switch to enhance the function of the flow switch and also reduces turbulence in the fluid flow system.

9 Claims, 4 Drawing Sheets

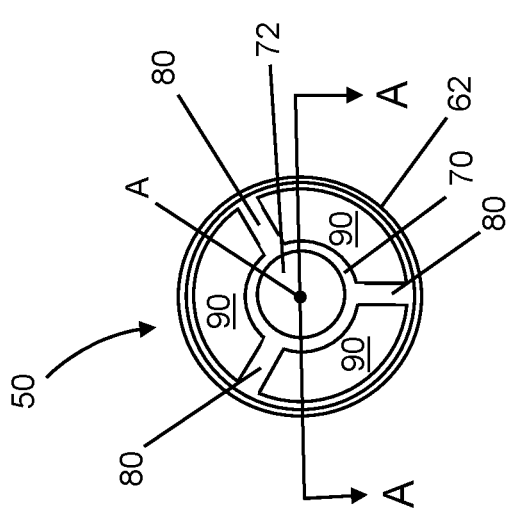
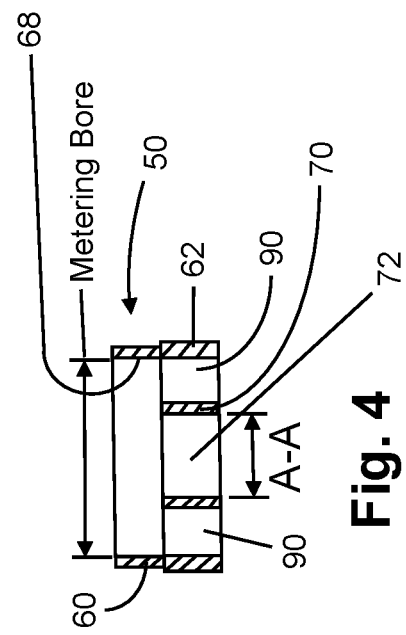

ORIFICE MODULE FOR FLOW SWITCH SYSTEM

CROSS-REFERENCE TO RELATED APPLICATION

This application claims the priority of U.S. Provisional Patent Application No. 62/310,066 filed on Mar. 18, 2016, the disclosure of which is incorporated herein by reference in its entirety.

BACKGROUND

This disclosure relates generally to flow switches for controlling fluid flow. More particularly, this disclosure relates to a flow switch having a pressure responsive member for controlling fluid flow.

This disclosure has application in conjunction with numerous fluid flow systems which employ a flow switch to generate an electrical signal to control the fluid flow through a conduit. One representative example to which the present disclosure relates is a flow switch of a type such as disclosed in U.S. Pat. No. 5,162,624. The flow switch employs a housing which can be molded from a polyvinyl chloride plastic material or other materials and which defines a flow path between an inlet and an outlet of the housing. The fluid flow system may be employed for various fluids. The housing has an extension which receives a bonnet assembly for mounting a flow switch. The switch assembly carries a magnetic field responsive signal generator such as a reed switch. Electrical leads extend through the body portion of the bonnet assembly. A displaceable shuttle is exposed to the fluid flow. The shuttle and the magnet are displaced by a calibrated flow rate so as to cause a signal generator to change state and transmit a signal from the leads. A bypass path which diverts flow from the main flow path may be opened to control the fluid flow.

The integrity of any flow switch and the ability of a flow switch to reliably function to control flow over a significant lifetime can be compromised when the flow switch is integrated into a flow passage which has a turbulent flow. An optimum regulatable flow is best realized with a long straight inlet conduit leading to the inlet for fluid exposure to the flow switch. However, space constraints for many installations do not allow for a sufficiently long straight flowpath.

The flow switch can also be compromised if the shuttle does not properly function concentrically or at a sufficiently precise aligned relationship to the flow path so that it slightly wobbles or engages against the metering orifice. The latter condition may be due to material creep over time or improper installation misalignment.

The orifice module of the present disclosure is capable of a dual function of reducing adverse consequences of turbulent flow such as may occur adjacent an elbow of a system and also providing a guide or holder for further ensuring that the flow switch assembly is properly concentrically aligned throughout its operation.

SUMMARY

Briefly stated, a flow switch system comprises a generally T-shaped housing having a fluid flow path from an inlet to an outlet and having an extension. A flow switch assembly is mounted in the extension. The flow switch assembly comprises a shuttle displaceable on a stem and is exposed to flow from the inlet toward the outlet. The switch assembly generates an electrical signal in response to fluid flow pressure. An orifice module is disposed in the housing. The orifice module comprises a cylindrical body symmetrical about a central axis defining a metering orifice and mounts an axial central hub. The central hub holds or guides the stem. The hub connects to the cylindrical body by at least three support spokes extending radially from the hub. The support spokes define a plurality of flow channels angularly disposed about the central axis.

In one embodiment, there are three spokes. The cylindrical body has a collar. The spokes have a generally V-shaped diverter structure.

A flow module for a flow switch system comprises a generally outer cylindrical sleeve having a central axis. An inner hub forms a cylindrical opening coaxial with the outer sleeve. A plurality of spokes connect the hub and outer sleeve and form a plurality of flow channels angularly disposed about the axis and defined between the segments of the inner hub and the outer sleeve, as best illustrated in FIGS. 1B and 1C.

In one embodiment, there are three spokes. The spokes are preferably equiangularly spaced. The outer sleeve is threaded at opposed ends and has a hex surface.

BRIEF DESCRIPTION OF THE DRAWINGS

FIG. 3 is an end view of the orifice module of FIG. 2;

FIG. 4 is an annotated sectional view of the orifice module of FIG. 3 taken along line A-A thereof;

DETAILED DESCRIPTION

Figure 2:
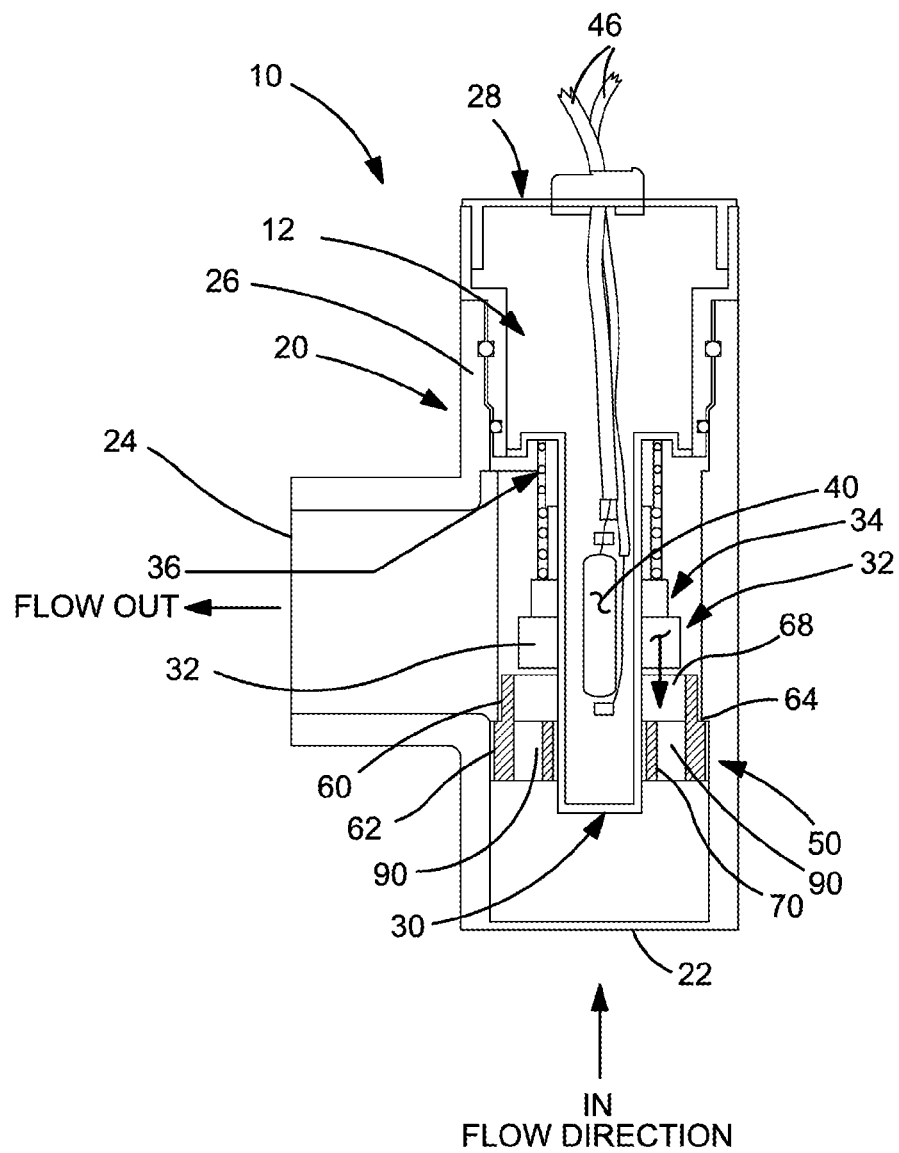
FIG. 2 is an annotated sectional view of a portion of a flow switch system which incorporates the orifice module of FIG. 1.

With reference to the drawings wherein like numerals represent like parts throughout, the principal portion of a representative fuel switch system, for which the orifice module of the present disclosure has particular applicability, is generally designated by the numeral 10 in FIG. 2. One preferred embodiment of the module is designated by the numeral 50. The module 50 is fixedly positioned in a fluid flow passageway adjacent to and in operative proximity to a flow switch assembly 12.

With reference to FIGS. 1-4, the module 50 comprises a generally cylindrical body 60 symmetric about axis A having a collar 62 at one end thereof. The collar 62 has a shoulder 64 to facilitate mounting. An interior central cylindrical hub 70 is coaxial with the cylindrical body and is axially disposed at the inflow end. The hub 70 is supported at the interior of the cylinder by three equiangularly spaced radial spokes 80.

Figure 1:
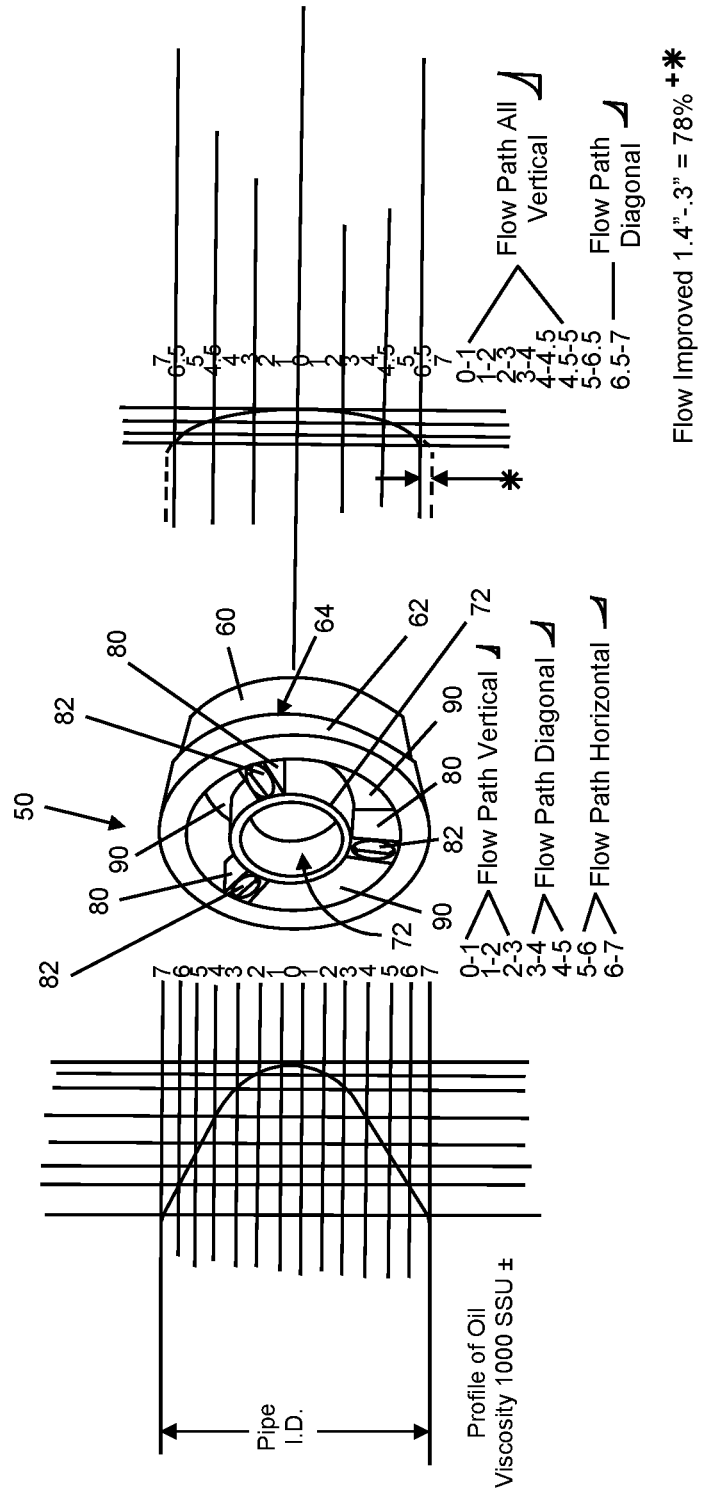
FIG. 1A is a perspective view of a representative orifice module.
FIG. 1B is an annotated schematic diagram showing a profile of oil viscosity and a representative long/straight pipe with the flow path being subdivided into consecutive laminar sections to illustrate the flow upstream from the orifice module of FIG. 1A.
FIG. 1C is an annotated schematic diagram showing a fluid flow path downstream from the orifice module of FIG. 1A, thereby illustrating the improved laminar flow provided by the orifice module.

The spokes 80 separate the interior of the cylindrical body into three arcuate shaped axial channels 90. The channels 90 function to improve the flow through the module, as best illustrated in FIG. 1. The spokes 80 may have a wide variety of configurations. The spokes 80 are preferably equiangularly spaced about the central axis. In some embodiments, more than three spokes are provided, although for most applications, it is believed that three spokes provide the optimum structure. The hub 70 defines a concentric guide holder for a stem of the flow switch assembly 12 and has clearance which receives the stem to concentrically secure the stem within the fluid path as described below. In some applications, the hub 70 defines a central flow channel 72. The opposed end of the body 60 defines a metering orifice 68.

With reference to FIGS. 2-4, a representative flow switch assembly 12 operatively employs the distributor/guide module 50. The flow switch assembly 12 is mounted in a T-shaped housing 20 which is preferably manufactured from PVC material. The housing 20 defines an inflow end 22 and an orthogonally positioned outflow end 24. It will be appreciated that the ends 22 and 24 connect with fluid conduits of various configurations which are not illustrated in the drawings. A third leg defines a receiver 26 for mounting the flow switch assembly.

The flow switch assembly 12 is mounted by a bonnet assembly 28 and sealed with the receiver 26 of the housing 20. The flow switch includes a stem 30 which mounts a displaceable shuttle 32 which axially reciprocates in and out of a metering orifice 68 in response to fluid pressure. The stem 30 also mounts an annular magnet 34 which is axially biased by a spring 36 and is carried by the shuttle 32. The shuttle 32 is thus also axially biased by the spring 36. A reed switch 40 fixedly positioned on the stem 30 interacts with the displaceable magnet 34 to generate electrical signals which are transmitted via electrical leads 46 extending through the top of the bonnet assembly. The signals typically actuate a stable electrical outlet to operate a pump (not illustrated).

The module 50 is inserted into the housing and retained in a fixed position against an interior shoulder. The upper inner cylindrical portion of the module interiorly defines the metering orifice 68 of the switch shuttle 32. The central hub 70 of the module functions as a central holder for receiving the end of the stem 30. The hub 70 functions to essentially align and hold the stem 30 generally axially (concentrically) to thereby prevent the shuttle 32 from engaging against the sides of the metering orifice.

In addition, the spokes 80, which connect the hub 70 to the cylindrical wall of the module, define three metering channels 90. The distributor flow channels 90 function to distribute the flow which is received in the inflow inlet end 22 of the housing. In the event that, for example, the inlet flow end is disposed adjacent an elbow connection which ordinarily may produce a somewhat turbulent flow, the spokes 80 and distributor channels 90 function to distribute the flow and eliminate a significant portion of the turbulence to provide a substantially uniform laminar flow which impinges the flow switch and in particular the shuttle 32. The fluid flow characteristics provided by module 30 are illustrated in FIGS. 1B and 1C.

The module 50 may be secured in place by adhesive, fasteners, a threaded engagement, a force fit engagement or other securement means.

The frontal (upstream) configuration of the spokes may present a V-shaped fluid diverting structure 82 to the fluid, a flat interface with the fluid or other geometric configurations.

The module 50 may be formed from PVC material, metals, brass, steel and other rigid materials.

Figure 6:
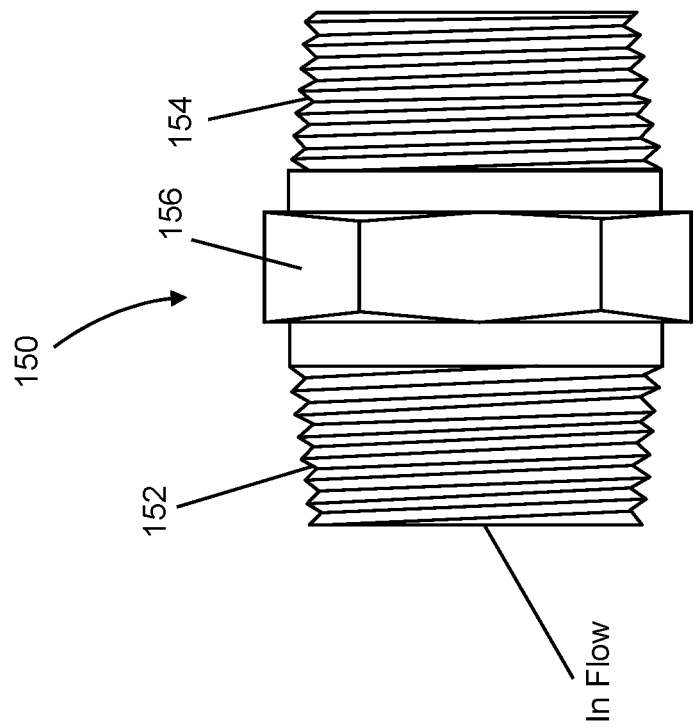
FIG. 6 is an annotated side view of the orifice module of FIG. 5.
Figure 5:
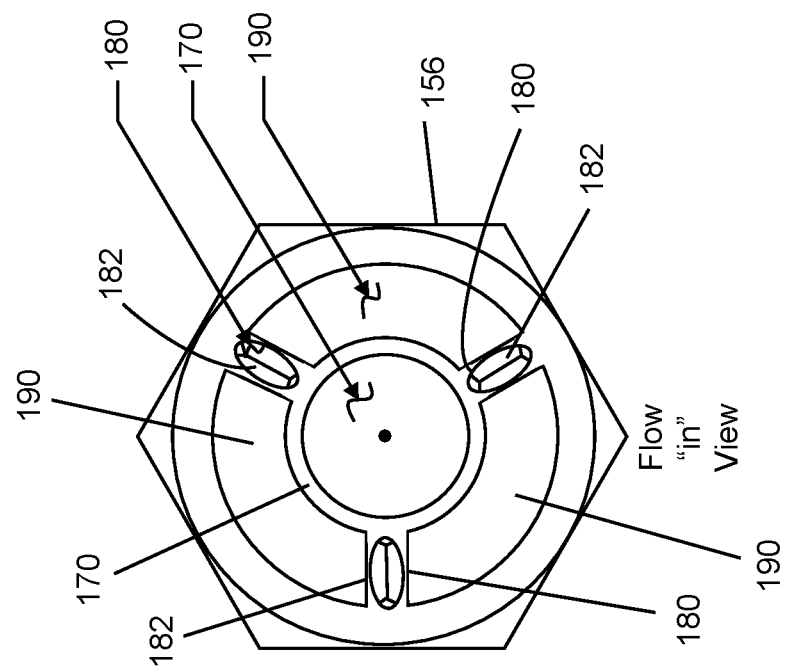
FIG. 5 is an annotated inflow end view of a second embodiment of an orifice module.

For a fluid switch installation which involves metal, steel or brass fittings, a module 150 may be formed from brass or other metals which are threaded into the housing and fluid conduits, as best illustrated in FIGS. 5 and 6. In this embodiment, the opposed exterior ends 152, 154 of the module 150 are threaded and an integral hex surface 156 is provided to facilitate the connections into the system. The module connections may employ NTP threads as illustrated, SAE threads or other threaded connections. The ends may also be configured to allow for socket welding or blazing.

As best illustrated in the end view of FIG. 6, the spokes 180 include V-shaped projections 182 to enhance the distribution of the inlet flow which provides three substantially congruent channels 190 around the hub 170 for the inlet flow to the switch. The hub also directs and maintains an existing center smooth axial flow for the fluid. The spokes 180 are preferably equiangularly spaced about the central axis. For this embodiment, the hub 170 may not receive and retain a stem of the flow switch but only function to reduce fluid turbulence.

It will be appreciated that the module functions to transform a turbulent flow into a more uniform laminar flow such as, for example, may be required without a significant linear pipe upstream from the flow switch. In addition, for some embodiments, the module ensures the concentric position of the stem which may result from creep of the materials over time.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A flow switch system comprising:
    a generally T-shaped housing defining a fluid flow path from an inlet to an outlet and having an extension;
    a flow switch assembly mounted in said extension and comprising a shuttle displaceable on a stem and exposed to flow from said inlet toward said outlet, and generating an electrical signal in response to fluid flow pressure; and
    an orifice module disposed in said housing comprising a cylindrical body symmetric about a central axis defining a metering orifice and mounting an axial central hub receiving said stem, said hub connecting to said cylindrical body by at least three support spokes extending radially from said hub and defining a plurality of flow channels angularly disposed about said central axis.

2. The flow switch system of claim 1 wherein there are three spokes.

3. The flow switch system of claim 1 wherein the spokes are equiangularly spaced.

4. The flow switch system of claim 1 wherein the cylindrical body has a collar.

5. The flow switch system of claim 1 wherein the spokes have generally V-shaped diverter structure.

6. A flow switch system comprising:
a generally T-shaped housing defining a fluid flow path from an inlet to an outlet and having an extension;
a flow switch assembly mounted in said extension and comprising a shuttle displaceable on a stem and exposed to flow from said inlet toward said outlet, and generating an electrical signal in response to fluid flow pressure; and
an orifice module disposed in said housing comprising a cylindrical body symmetric about a central axis defining a metering orifice and defining a central axial sleeve, said hub connecting to said central body, said hub connecting to said cylindrical body by at least three support spokes extending radially from said hub and defining a plurality of flow channels angularly disposed about said central axis.

7. The flow switch system of claim 6 wherein there are three spokes.

8. The flow switch system of claim 6 wherein each of the spokes has a generally V-shaped diverter structure.

9. The flow switch system of claim 6 wherein said spokes are equiangularly spaced.

* * * * *